United States Patent [19]
Werner

[11] Patent Number: 5,897,725
[45] Date of Patent: Apr. 27, 1999

[54] CRACK PATCH FOR REPAIR OF WINDSHIELD LONG CRACKS

[76] Inventor: Frank D. Werner, Box SR9, Jackson, Wyo. 83001

[21] Appl. No.: 08/800,964

[22] Filed: Feb. 18, 1997

Related U.S. Application Data

[60] Provisional application No. 60/030,736, Nov. 12, 1996.

[51] Int. Cl.$^6$ .......................... B29C 73/10; B32B 35/00
[52] U.S. Cl. .......................... 156/94; 29/402.09; 52/514; 428/63
[58] Field of Search ................. 428/63; 156/94, 156/98; 29/402.09, 402.11; 52/514

[56] References Cited

U.S. PATENT DOCUMENTS

| | | | |
|---|---|---|---|
| 3,574,256 | 4/1971 | Chase | 29/402.11 |
| 3,814,645 | 6/1974 | Fletcher . | |
| 3,850,718 | 11/1974 | Trapani | 428/63 |
| 3,914,145 | 10/1975 | Forler | 156/98 |
| 4,098,425 | 7/1978 | Yamamoto | 220/403 |
| 4,753,695 | 6/1988 | Alexander | 156/94 |
| 4,776,906 | 10/1988 | Bernard . | |
| 4,859,491 | 8/1989 | Yan . | |
| 4,961,799 | 10/1990 | Cologna et al. . | |
| 4,961,883 | 10/1990 | Jacino | 425/13 |
| 5,234,325 | 8/1993 | Hill . | |
| 5,372,761 | 12/1994 | Anderson, Sr. . | |
| 5,401,152 | 3/1995 | Jacino et al. . | |
| 5,512,116 | 4/1996 | Campfield . | |
| 5,565,217 | 10/1996 | Beckert et al. . | |

*Primary Examiner*—Daniel Stemmer
*Attorney, Agent, or Firm*—Westman, Champlin & Kelly, P.A.

[57] ABSTRACT

A patch is placed at one end of a repaired long crack in a windshield to prevent the repaired long crack from being overstressed and separating under load, which may be caused by flexing or differential thermal expansion. The patch spans the crack laterally and is placed adjacent an end of the crack, generally very near the edge of the windshield. The patch is bonded to the glass to reinforce the crack by carrying loads tending to separate the crack. The patch material is preferably at least as rigid as the glass and is bonded to the glass by a strong adhesive such as an epoxy resin.

11 Claims, 3 Drawing Sheets

CRACK PATCH FOR REPAIR OF WINDSHIELD LONG CRACKS

CROSS REFERENCE TO RELATED APPLICATION

Reference is made to copending U.S. provisional patent application Ser. No. 60/030,736, filed Nov. 12, 1996 entitled CRACK PATCH FOR REPAIR OF WINDSHIELD LONG CRACKS.

BACKGROUND OF THE INVENTION

The present invention relates to a reinforcement that reduces the stresses in long cracks in automobile windshields in particular, which have been repaired with a filling of repair material, such as a resin, to suppress failures of the repair material in the crack.

Various windshield repair devices have been advanced, and some are provided for filling long cracks in windshields. For example, U.S. Pat. No. 5,512,116 illustrates a repair device and process for long cracks, by filling the crack with a resin, and in this instance, the disclosure provides a bead of resin bridging the crack near the edge of the windshield. The patent discloses that a higher viscosity resin should be used for the bridge at the edge of the windshield. Merely having a resin "bridge" on the glass does not provide for a sufficient reduction in stress on the resin in the crack to reduce failures from temperature differentials and flexing of the frame that supports the windshield, including the automobile frame.

Repair methods utilizing patches have been advanced for other uses. For example, U.S. Pat. No. 4,859,491 shows a cryogenic heat exchanger having a fissure in the heat exchanger body, that is repaired by filling with an adhesive or sealant and laying a metal patch over the crack, and in a position to span the fissure or crack.

Repair resins for cracks in windshields are also disclosed in U.S. Pat. No. 5,069,836 to Werner et al. The resin used can be ultraviolet light cure resin. Such resin is preferred in many instances. The injection of resin into a long crack for repair is done in accordance with the previously taught repair procedures.

These previously taught procedures are widely used for repairing cracks in glass, and in particular windshields, and they do use a reasonably strong and optically acceptable resin. The resin is introduced in the crack and cured to bond the glass back together at the break. After the repair, the windshield is subjected to stress resulting from such causes as flexing of the automobile frame and temperature variations. A common result is that the crack repair fails, almost always initially at the edge of the windshield, and then the failure usually propagates along the repaired crack, ruining the repair. Repair resin bonds are usually not as strong as the original undamaged windshield.

The present invention provides a reinforcement that will suppress such failures and increase the effectiveness of existing repair procedures.

SUMMARY OF THE INVENTION

A crack in a windshield, which has been repaired using existing techniques is provided with a stress carrying patch or tab of suitable material that is applied at or very near the edge of the glass and which laterally spans the crack. The patch is made of a material that is rigid, and preferably as rigid as the glass or more so. The Young's Modulus, (a well-known measure of stiffness of material) of the patch is preferably selected to be greater than that of the windshield, although lower Young's Modulus will work. Also, the thermal expansion coefficient of the material from which the patch of the present invention is made should be near that of the windshield glass to minimize thermal expansion mismatch. The patch is bonded to the outside surface of the glass to overlie the crack by a strong, firm adhesive, such as a suitable epoxy resin, so that it is firmly secured to the surface of the glass and spans the crack to carry loads tending to separate the surfaces of the crack. The load carried by the patch reduces the stresses on the resin that is bonding the crack sides together.

Tensile stresses on the crack repair resin that are tending to separate the facing side surfaces of the crack, may result from various sources after the repair is finished. Slight flexing of the frame into which the glass is mounted is normal. This can cause the glass to bend slightly so that it becomes more concave outwardly, or less so. When this happens, the bending stresses cause either tensile or compressive stresses on resin filling the repaired crack. Tensile stresses generally can cause the repair to fail. Compressive stresses do not.

The presence of thermal stresses also is important. In cold weather, it has been observed that the interior heat provided by an interior defroster of a vehicle will cause the central part of the windshield to expand while the edges may be relatively unheated. Expansion of the warm central part then puts tensile stress on the surrounding cold glass, including the repair. Thus, tensile stress at the edge results when the central part is warmer than the edge part.

A similar effect results when the inner (rear) surface of a windshield is warmer than the outer (front) surface. Expansion of the inner surface causes tensile stress in the outer surface. This is another way in which a vehicle defroster can cause cracks.

Experimentation has shown that the Young's modulus or stiffness of the patch of the present invention is important, and should be at least one-half of that of glass and preferably at least as great as the glass, and most preferably two or more times greater.

Epoxy resin is a good choice for securing the patch in place on the glass surface. Such resin is selected to have good shear strength and good stiffness for shear deformation. The patch reduces the failure of cracks because of tensile stress directly on the repair material.

DETAILED DESCRIPTION OF THE PREFERRED EMBODIMENTS

Figure 1:
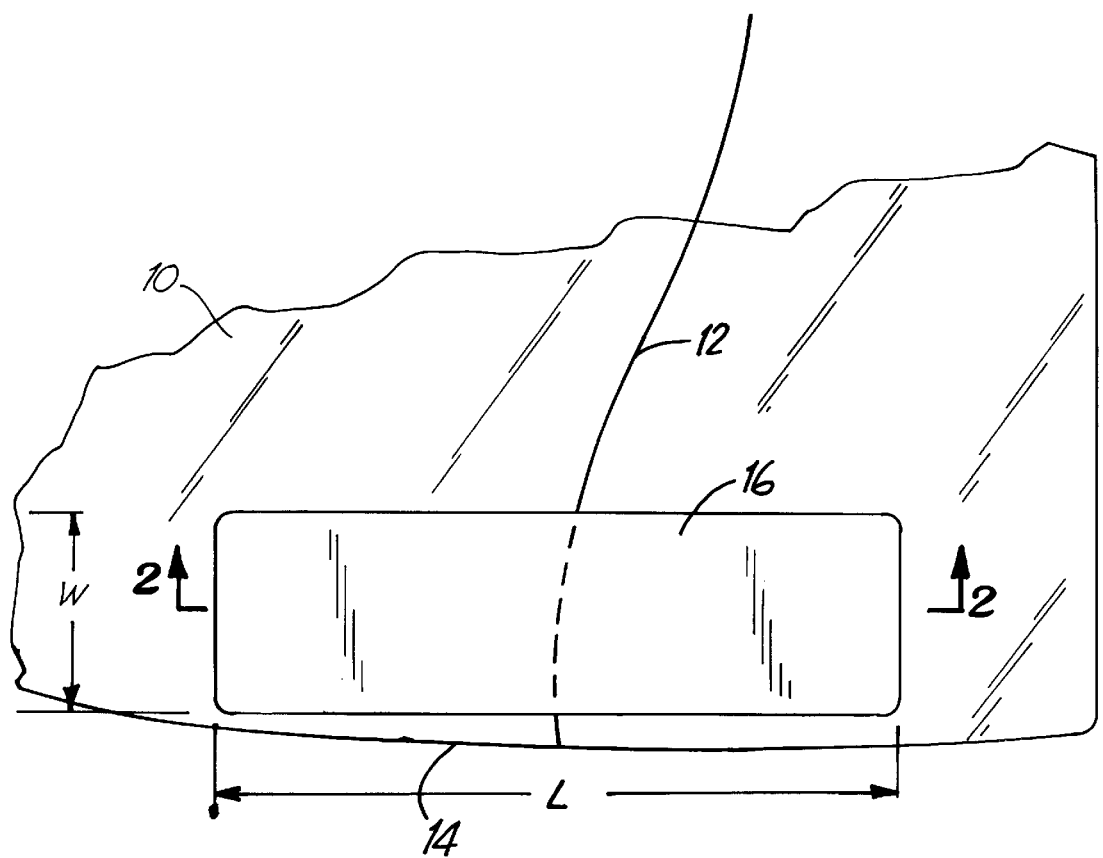
FIG. 1 is a fragmentary schematic representation of a portion of a windshield having a long crack that has been repaired, and it shows a patch made according to the present invention in place adjacent the edge of the windshield.

In FIG. 1, there is a windshield 10 represented, and it has an elongated crack 12 that extends to an outer edge 14 of the windshield. This crack 12 has been repaired with a filling of epoxy resin in the normal manner as shown in the prior art. In order to reduce the likelihood of failure of the repair, a patch or tab 16 made according to the present invention is placed over the crack, and spans the crack. The patch 16 is of suitable size and thickness, and is positioned as close to the edge 14 of the windshield as reasonably practical. FIG. 1 shows the patch length L and width W.

The patch material is selected to fulfill the criteria of being stiff, meaning that it has a Young's modulus at least one-half that of glass and most preferably two or more times that of glass used in the windshield 10. The patch 16 is bonded to the glass surface with a thin layer of epoxy or other adhesive indicated at 18 in FIG. 2. The windshield 10, as can be seen, is safety glass having a first layer of glass 20, a second layer of glass 22 and a plastic layer 24 sandwiched between the glass layers and holding the layers together.

Figure 2:
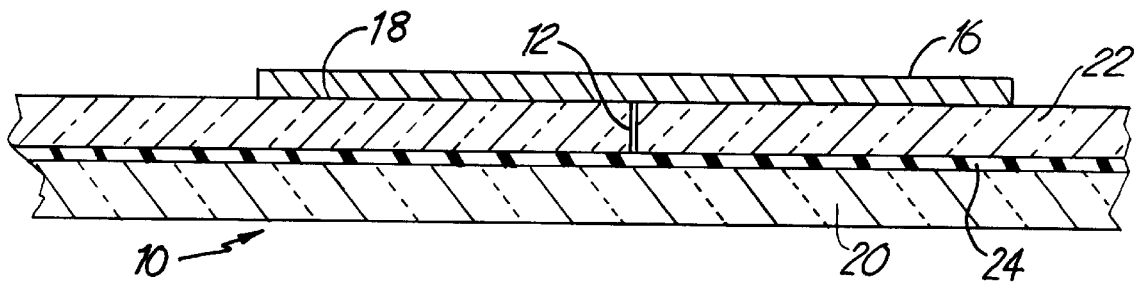
FIG. 2 is a sectional view taken along line 2—2 in FIG. 1.

The crack 12 as indicated in FIG. 2, extends through the upper layer or outer layer 22 of glass. The patch 16 is secured to the outer surface of the glass layer 22 and has sufficient surface area secured to the glass so the adhesive used will adequately carry loads placed on the patch.

Figure 3:
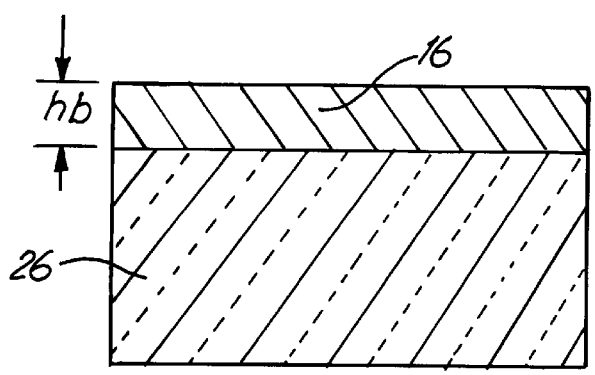
FIG. 3 is a schematic representation of a model of the windshield and patch shown in FIG. 1 used in calculating stresses with the patch present and for analyzing the effectiveness of a patch.

FIG. 3 is a model of the windshield 10 considering it to be a single layer of glass 26 for purposes of comparative calculations for stresses at a break. The patch 16 is illustrated on top of the glass layer 26. The thickness of the patch is represented by "hb". The patch 16, as shown, has a length that is substantially greater than its width, and the length is the direction transverse to the repaired crack 12.

The analysis as set forth below provides a guideline for selecting the material and thickness of the patch 16.

As was pointed out, the loads on the crack 12 may be either from bending or tensile stresses, or a combination of both. The section in FIG. 3 is a simplified showing of a simpler beam than the actual windshield 10, by treating the two layers of glass 20,22, which are bonded together, as a single plate of glass. Furthermore, for the patch, the length L and width W are assume to be much longer than the thickness of the glass. These approximations are still quite adequate to guide the general choice of material for the patch 16. Experiments on an actual windshield specimen confirm that the conclusions (based on these approximations) that follow are reasonable.

When a bending moment is applied to the model of FIG. 3, theory exists for calculating the stresses at the break. Such theory is explained in the book, "Formulas for Stress and Strain" by R. J. Roark and W. C. Young, (C) 1975, McGraw-Hill, pages 112 and 113, by the "equivalent width" technique. A 1 inch width was selected for the patch 16 (width actually cancels out of the calculation). The thickness of the glass is 0.25 inch and the glass has a Young's modulus of 10,000,000 pounds per square inch (abbreviated as 10E6 psi). Patch materials of various values of Young's Modulus were analyzed. The maximum stress in the repair resin (also called bonding material) at the break when a small bending moment was applied with no patch present was calculated. Also the stress with the patch 16 present was calculated. From these results, the ratio of stress without the patch to the stress with the patch was determined and called "srm" (for Stress Ratio with bending Moment). The result of srm for various materials and various thicknesses of patch is shown in FIG. 4, in the upper three curves.

A similar ratio when simple tensile stress is applied to the beam was calculated. This is a much simpler case to analyze. This ratio of tensile stress in the crack repair resin without the patch to the tensile stress in the crack repair resin with the patch was called "srt" (for Stress Ratio with Tensile stress). This result is also shown in FIG. 3 as the bottom three curves or plots.

Figure 4:
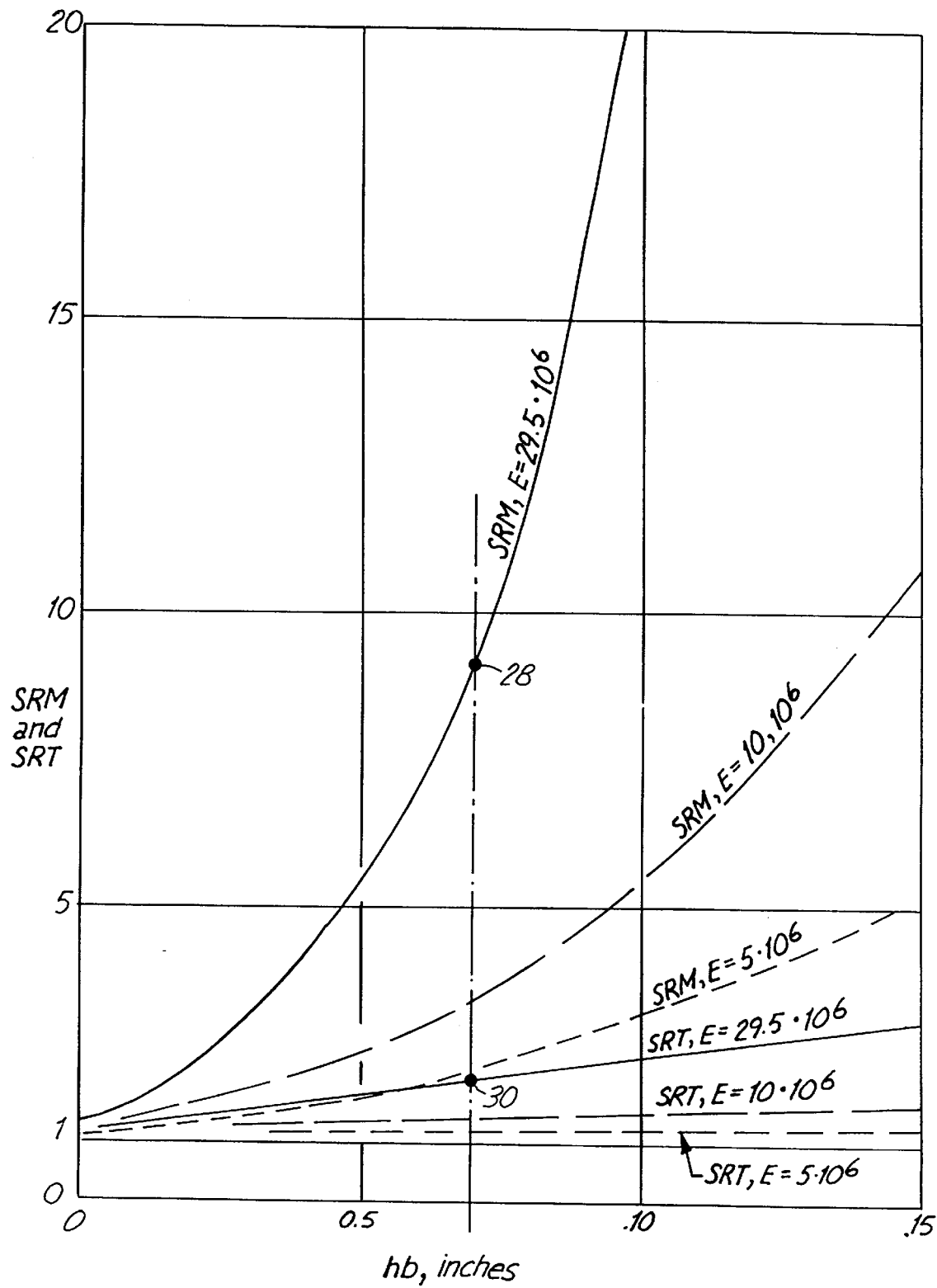
FIG. 4 is a plot of results of calculations made using the model of FIG. 3.

To interpret FIG. 4, one must recognize that it is important for both "srm" and "srt" to be considerably higher than 1. That means that the stress is reduced by the reciprocal of the ratio when the patch is present. The two dots represented at 28 and 30 show a good design choice for the patch for material having Young's Modulus (E) of 29.5 million psi (29.5E6psi) For that case, when the patch thickness is 0.07 inch, "srm" is about 8 and "srt" is about 2, so it follows that bending and tensile stress in the resin forming the repair is respectively ⅛th and ½ as much when the patch is present.

FIG. 4 shows that if the patch has the same Young's Modulus as glass (10 million psi), the patch would need to be about twice as thick to achieve this reduction of stress at the repair. Further, if the material of the patch had Young's Modulus of 5 million psi (such as for epoxy resin for example), the thickness required for the patch to be effective would be far greater, although the arrangement could be made to work.

The conclusion is that Young's Modulus (stiffness) of the patch is very important. It should be at least one-half that of the glass, and preferably at least as great as for the glass, and most preferably 2 or more times greater. It should also have tensile strength comparable to or greater than glass. Considering strength and stiffness, certain metals and possibly certain ceramic materials are suitable.

Temperature changes (uniform throughout the windshield) will cause no stress at the patch 16 only if the thermal expansion of the patch 16 is the same as for the glass. it follows that it is desirable for the patch 76 to have a thermal expansion coefficient reasonably near that of glass, for example 0.7 to 1.5 times that of glass, although the closer to the value for glass, the better.

When stiffness, strength, and thermal expansion are considered, one finds that #430 stainless steel is a good choice. Its Young's Modulus is 29.5 million (the case for the upper curves in FIG. 3) and its coefficient of thermal expansion is 5.5 millionths (inch/inch-degree Fahrenheit) as compared to 5 millionths for glass. Depending on heat treatment, its strength may be 40,000 psi or more, which is quite strong. Most steels have thermal expansion coefficients about twice as high as glass and very stiff materials, such as tungsten, are much lower.

The patch 16 must be bonded to the glass layer 22 with adhesive having reasonably good shear strength. If the bond layer 18 is thick, shear stiffness may also be important. For example, if bonded with rubber-based contact cement, shear deformation of the adhesive would prevent the strong patch material from bracing the repaired glass adequately unless thickness of the adhesive is extremely small and/or the patch length is quite great. Epoxy cement is available which has good shear strength and shear stiffness, bonds well to glass with a thin bond, and is well suited to this use as a patch bonding material. Other strong adhesives should be very satisfactory, such as acrylic-based cements used for holding automotive mirrors and trim in place.

The shear strength of the bond is easily analyzed with the simplifying approximation that width of the patch is not considered. What is needed is the required length L of the patch (transverse to the crack) so that the strength of the bond joint will be sufficient to realize full strength of the material of the patch. In that case, it is found that the relation can be expressed in an equation:

$$L = 2 * t * Sp / Se, \tag{1}$$

where L is the patch length, t is the patch thickness, Sp is the maximum allowable tensile stress in the patch, and Se is the maximum allowable shear stress in the adhesive.

As a practical example, it is reasonable to use 430 stainless steel with an epoxy having a maximum allowable shear stress of: Se=2,000 psi. In that case, equation (1) simplifies to:

$$L=40*t. \qquad (2)$$

Table 1 results from equation (2), where both t and L are given in inches:

TABLE 1

| t | .01 | .02 | .03 | .04 | .05 | .10 |
|---|-----|-----|-----|-----|-----|-----|
| L | .4  | .8  | 1.2 | 1.6 | 2.0 | 4.0 |

FIG. 4 and Table 1 provide the basic design guidance. Good choices would be 430 stainless steel and epoxy for the bonding adhesive. Materials such as fiberglass reinforced epoxy or glass for the patch would be relatively unsatisfactory, mainly because their Young's Modulus (stiffness) is insufficient based on guidance of FIG. 4.

For 430 stainless steel and an epoxy bonding material, it is a reasonable conclusion that preferably the patch thickness should be about 0.04 to 0.05 inch and it should be 1.6 to 2.0 inches long. A reasonable width would be ¾ inch, but somewhat narrower or wider width would probably be quite helpful as compared with no patch. Thus, the minimum dimension of the patch should be a thickness of at least 0.03 inches, a width of at least 0.5 inches and a length of at least 1 inch. The length extends across the crack.

Glue with higher shear strength than 2,000 psi would allow the patch to be thicker (and per FIG. 4, better) or to be shorter. Perhaps epoxy strength up to 3,000 psi is possible, even with weathering and aging effects. It would improve the patch performance or allow the patch to be smaller, or a combination of these advantages. An adhesive having an allowable shear stress of 1000 psi can be used, but the patch becomes correspondingly longer.

Other materials, such as other stainless steels, or material such as tungsten would be useful. Thermal expansion effects indicate the patch should have thermal expansion coefficient near that of glass. The epoxies can be those supplied by existing manufacturers, and selected from the manufacture's specifications to obtain the sheer strength that is in the range of 2000 psi or better, or other adhesives may be used.

The patch 16 is easily applied, and once cured in place will be operative to reduce the tensile stresses in the crack 12 to a level where the repair life will be enhanced.

The patch 16 is easily made, simple to install and low cost, and greatly increases the life of a repaired windshield.

The exposed surface of the patch can carry an advertising message, name, address and phone number of the manufacturer of installer, or merely a day brightening slogan.

Although the present invention has been described with reference to preferred embodiments, workers skilled in the art will recognize that changes may be made in form and detail without departing from the spirit and scope of the invention.

What is claimed is:

1. A method of strengthening a repaired crack in a windshield wherein the crack extends to adjacent an edge of the windshield, comprising the steps of selecting a material having a Young's Modulus at least equal to that of glass;

forming a patch from the material that is thinner than the glass;

bonding the patch to the glass surface with a bonding material such that the patch has portions of substantially equal length on opposite sides of the crack, and is selected so that the patch length is determined by the equation L=2*t*Sp/Se, where L is the patch length, t is the patch thickness, Sp is the maximum allowable tensile strength in the patch, and Se is the maximum allowable shear stress of the bonding material.

2. The method of claim 1, wherein the patch material and size is selected so that the ratio of stress with a bending moment on the crack causing tensile stress in the crack bonding material to the stress in the crack bonding material with a patch applied is in the range of eight.

3. The method of claim 2, wherein the patch material and size is selected such that a ratio of tensile stress in the bonding material in the crack without the patch to the bonding material in the crack with the patch applied is in the range of two.

4. The method of claim 1 including the step of forming the patch to have a length greater than the width.

5. A repaired vehicle windshield made of laminated glass and having a long crack therein, wherein the crack has a repair bonding material therein, said crack extending to adjacent an edge of the windshield, the improvement comprising a patch member spanning the crack laterally and being bonded with a patch bonding material to the surface of the glass on opposite sides of the crack, the patch bonding material having a shear strength in relation to the surface area of the patch member bonded to the glass surface to carry a substantial portion of the tensile strength of the patch without yielding.

6. The improvement of claim 5, wherein said patch member is made of a stainless steel.

7. The improvement of claim 5, wherein the patch member has a Young's Modulus greater than one-half of the Young's Modulus of the glass carrying the crack.

8. The improvement of claim 5, wherein the patch member has a Young's Modulus that is greater than two times the Young's Modulus of the glass.

9. The improvement of claim 5, wherein said patch member is substantially thinner than the glass and is intimately bonded across its entire surface to the underlying surface of the glass.

10. A repaired windshield made of laminated glass and having a long crack therein, wherein the crack has a repair bonding material therein, said crack extending to adjacent an edge of the windshield, the improvement comprising a patch member made of a material having a Young's Modulus that is greater than two times the Young's Modulus of the glass and having a coefficient of thermal expansion substantially matching that of glass, the patch member spanning the crack laterally and being bonded with a patch bonding material to surface portions of the glass on opposite sides of the crack, the patch bonding material having a shear strength in relation to the surface area of the patch member bonded to the glass surface portions to carry a substantial portion of the tensile strength of the patch member without yielding.

11. The improvement of claim 10, wherein said patch member is substantially rectilinear in configuration and has a length of at least one inch extending in direction across the crack.

* * * * *